(12) United States Patent
Park et al.

(10) Patent No.: US 10,722,859 B2
(45) Date of Patent: Jul. 28, 2020

(54) MANUFACTURING CORE-SHELL CATALYST AND APPARATUS FOR SCALE-UP MANUFACTURING THE SAME

(71) Applicant: Korea Institute of Energy Research, Daejeon (KR)

(72) Inventors: Gu-Gon Park, Daejeon (KR); Sun-Mi Hwang, Daejeon (KR); Sung-Dae Yim, Daejeon (KR); Chang-Soo Kim, Incheon (KR); Won-Yong Lee, Daejeon (KR); Tae-Hyun Yang, Daejeon (KR); Seok-Hee Park, Daejeon (KR); Minjin Kim, Daejeon (KR); Young-Jun Sohn, Daejeon (KR); Byungchan Bae, Daejeon (KR); Seung-Gon Kim, Daejeon (KR); Dongwon Shin, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 15/646,997

(22) Filed: Jul. 11, 2017

(65) Prior Publication Data

US 2018/0154329 A1     Jun. 7, 2018

(30) Foreign Application Priority Data

Dec. 7, 2016   (KR) .......................... 10-2016-0166137

(51) Int. Cl.
*B01J 19/18*     (2006.01)
*B01J 19/08*     (2006.01)
(Continued)

(52) U.S. Cl.
CPC ......... *B01J 19/088* (2013.01); *B01F 11/0225* (2013.01); *B01F 11/0266* (2013.01);
(Continued)

(58) Field of Classification Search
None
See application file for complete search history.

(56) References Cited

U.S. PATENT DOCUMENTS 6,214,299 B1 *   4/2001   Holladay ................. A61L 2/16
                                                        422/186.21
2017/0276624 A1 *  9/2017   Chen ....................... C25B 15/02

FOREIGN PATENT DOCUMENTS

JP       2016126907     *  7/2016    ............. B01J 23/89
KR    10-2006-0082595 A    7/2006
KR    2009-0045412 A       5/2009

\* cited by examiner

*Primary Examiner* — Stefanie S Wittenberg
(74) *Attorney, Agent, or Firm* — Foley & Lardner LLP

(57) ABSTRACT

To provide a reactor to improve evenness in the thickness of shell metals coated on the surface of core particles by increasing area sizes in the reactor chamber to control electric potentials, the present invention is configured to comprise a top surface able to move up and down while serving as a working electrode, a wall serving as a working electrode, a bottom surface, a standard electrode, a power supplying part and a solution injecting part, wherein the top surface can move up and down automatically by an electric motor or manually. Also, the top surface is configured to be suitable for the interior diameter of the reactor chamber, for solutions inside the reactor chamber not to leak from the top surface or from the crevice between the top surface and the wall of the reactor chamber. The bottom surface of the reactor chamber may comprise an impeller or an ultrasonic wave diffuser to bring about even diffusion in the reactor chamber.

12 Claims, 2 Drawing Sheets

(51) Int. Cl.
*B01J 37/02* (2006.01)
*B01J 33/00* (2006.01)
*B01J 19/10* (2006.01)
*H01M 4/86* (2006.01)
*B01F 11/02* (2006.01)
*H01M 4/90* (2006.01)
*H01M 4/92* (2006.01)

(52) U.S. Cl.
CPC ............ *B01J 19/087* (2013.01); *B01J 19/10* (2013.01); *B01J 33/00* (2013.01); *B01J 37/0221* (2013.01); *H01M 4/86* (2013.01); *B01J 2219/00049* (2013.01); *B01J 2219/0272* (2013.01); *B01J 2219/0277* (2013.01); *B01J 2219/082* (2013.01); *B01J 2219/0809* (2013.01); *B01J 2219/0877* (2013.01); *H01M 4/9041* (2013.01); *H01M 4/92* (2013.01)

[FIG.1]
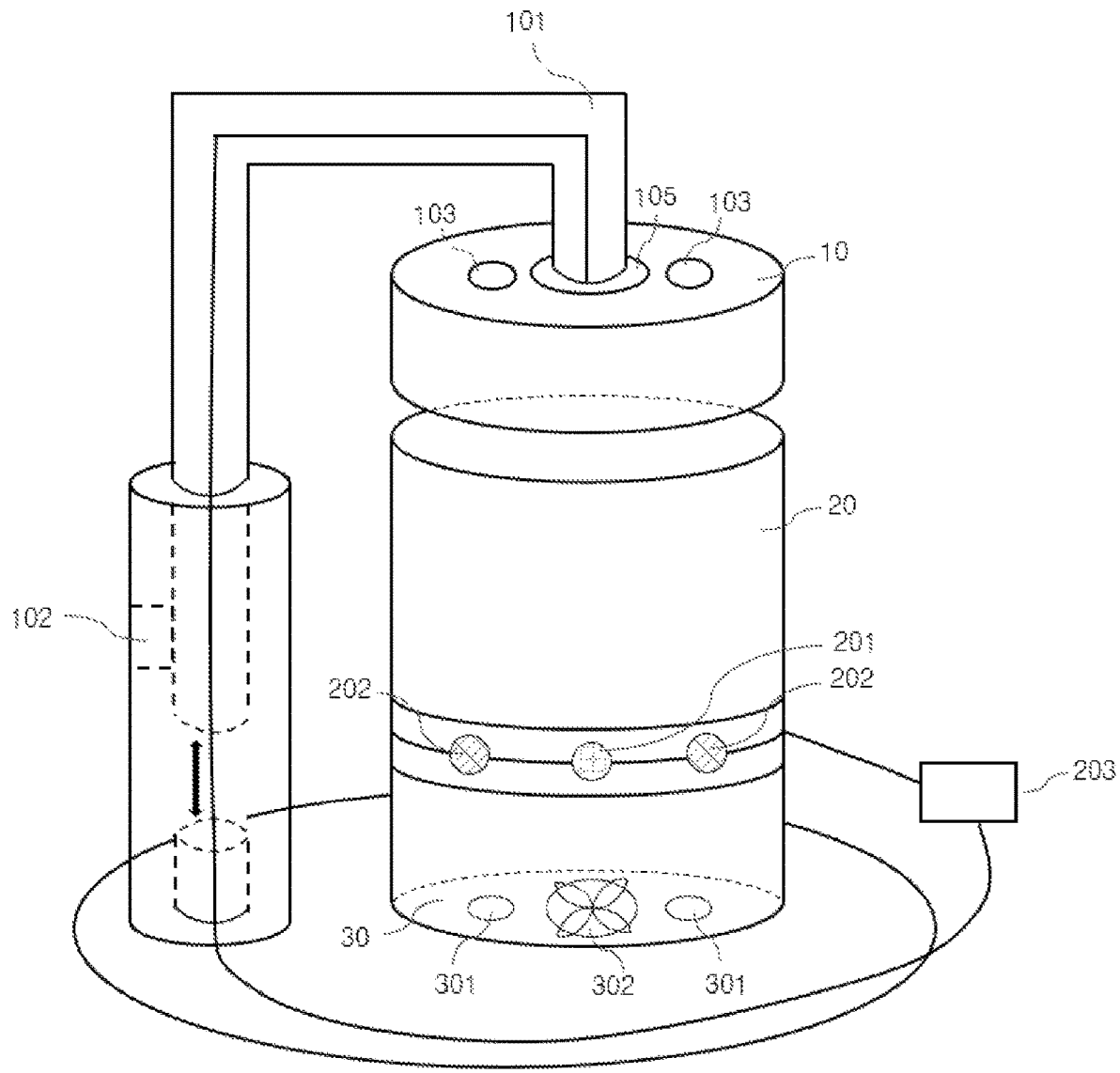

[FIG.2]
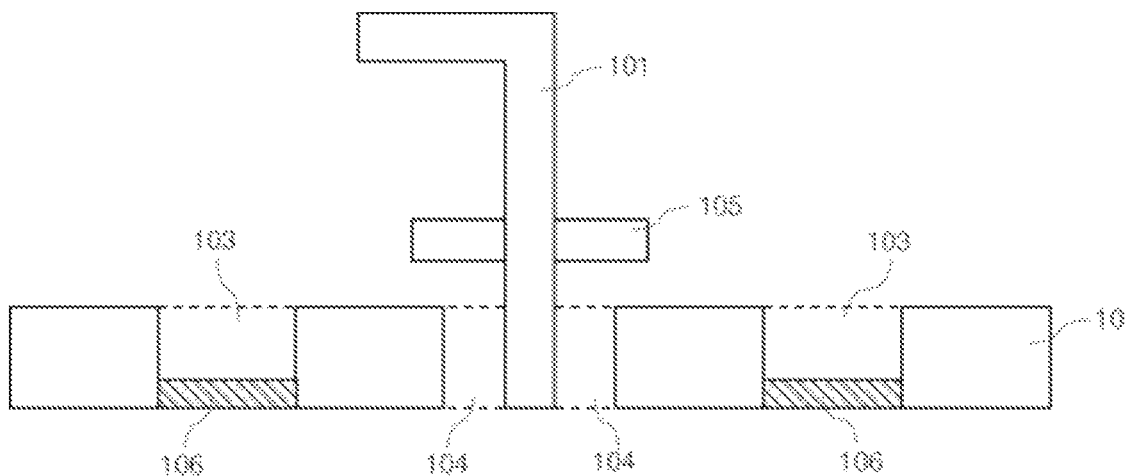
[FIG.3]
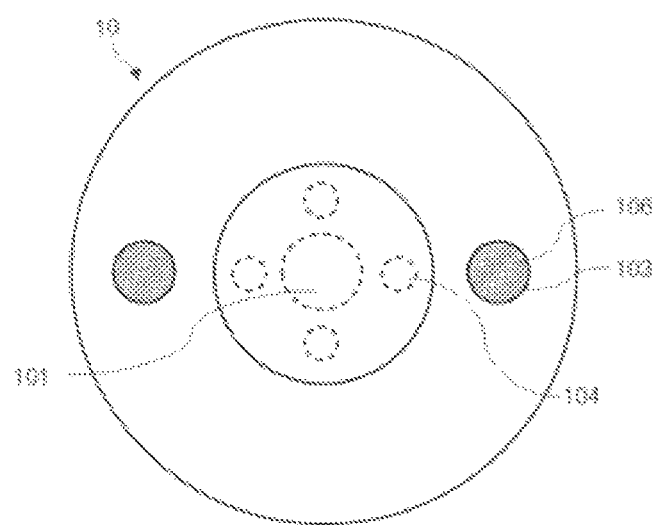

MANUFACTURING CORE-SHELL CATALYST AND APPARATUS FOR SCALE-UP MANUFACTURING THE SAME

CROSS-REFERENCE TO RELATED APPLICATIONS

The present application claims priority to Korean Patent Application No. 10-2016-0166137 filed Dec. 7, 2016.

FIELD OF THE INVENTION

The present invention relates to an apparatus for mass-producing particulate matter of equal size and of equal thickness, and particularly, to a UPD reactor based on potential differences.

BACKGROUND OF THE RELATED ART

Catalysts are widely used as high added value consuming goods in the modern industrial society, in particular, in the refinery and manufacturing industries. And catalysts are used in various areas ranging from large facilities for manufacturing hydrogen and for hydrodesulfurization, including plant-scale packed column reactors, to small devices such as hydrogen fuel cells. Particularly, fuel cells are considered to replace traditional fossil fuels based on petroleum and they are hailed as a new environmentally friendly energy source with a high market potential.

In hydrogen-fuel-cell systems, electricity is generated through a chemical reaction where hydrogen is oxidized in the negative electrode, and oxygen is reduced in the positive electrode to produce water. During the process, hydrogen fuel cells operate at relatively low temperatures of 50° C. to 100° C. and have a good point of having high energy density. However, they have a low power output due to their low reaction temperatures. Additionally, hydrogen fuel cells consume a large amount of platinum catalysts and water vapor needs to be removed from the surfaces of hydrogen fuel cells. Particularly, tens of thousands of oxidation and reduction that take place during electricity generation lower catalytic activities thereby pulling down performance of fuel cells.

Equal sizes and purity of catalysts are not influential factors in plant-scale facilities of the traditional industries but are highlighted as key factors, in fuel-cells whose reactions happen in a limited space and consume a large amount of platinum.

In Korean Patent Publication No. 2009-0045412, a catalyst particle is presented. The catalyst particle is configured to comprise M core/M shell structures, whose inner particle core is palladium and whose outer particle shell is platinum, to solve the above described problem. However, it has the disadvantage that catalytic activities are reduced due to colloidal dispersion liquids which are not removed. And in Korean Patent Publication No. 2006-0082595, a method for manufacturing an electrode catalyst for fuel cells is presented. The method comprises manufacturing a precursor solution by dissolving metallic compound particles consisting of palladium and precursor compounds consisting of activated particles with a core-shell structure having platinum coated layers or alloy-containing-platinum coated layers on the entire surface of the metallic compound particles thereby having palladium, and drying up metallic compound particles put in a catalytic carrier. However, it has the disadvantage that catalyst particles do not have equal sizes.

SUMMARY OF THE INVENTION

As a means to solve the above mentioned problem, the present invention is directed to providing a reactor to improve evenness in the thickness of shell metals coated on the surface of core particles by continuously manufacturing metal core particles of equal nano-size and increasing the area size to be able to control electric potentials in a reaction chamber.

The present invention is also directed to providing a QC device, together with the reactor, to be able to monitor and control the quality of a catalyst generated in a UPD reactor by monitoring reaction conditions such as temperatures, pressures, potential differences, etc. and measuring concentration of the catalyst.

The UDP reactor of the present invention is configured to comprise a top surface configured as an electric conductor to serve as a working electrode while being able to move up and down; a wall configured to have the same shape as the top surface to allow the top surface to move up and down inside the reactor and configured to allow the exterior of the top surface to contact the interior of the wall, and configured as an electric conductor to serve as a working electrode; a bottom surface configured to face the top surface and to join the wall; a power supplying part to input voltages into a reference electrode and an electrode; and a solution injecting part.

The UDP reactor of the present invention is also configured to comprise a displaying part to show the kind of precursors, the amount of precursors, the kind of reaction liquids, temperatures, pressures, voltages and concentration of products and in doing so, it is configured to comprise a sensor to measure temperatures, pressures, voltages and concentration of products, wherein the sensor to measure concentration of products is configured to comprise infrared light sources and a detector to detect the infrared light sources.

In addition, the top surface of the UPD reactor, according to the present invention, can move up and down by an electronic motor and a driving shaft connected to the electronic motor, or manually and it comprises a plurality of channels, where a solution under the top surface goes up through the top surface, having a filter inside of it and a plurality of channels where solutions over the top surface come down through the top surface.

Further, all told, two or more reference electrodes and counter electrodes are installed through the wall of the UPD reactor, wherein the reference electrodes and counter electrodes do not protrude from the interior of the wall and a filter is placed at the end of the reference electrodes and counter electrodes contacting the solution inside the wall.

Moreover, the bottom surface of the UPD reactor of the present invention comprises an impeller to mix solutions inside the chamber of the reactor and an impeller driving motor, and it may be configured to comprise a flat-type or block-type ultrasonic wave generator, provided together with or separately from the impeller, wherein the impeller and ultrasonic wave generator are enclosed in the bottom surface so that they do not protrude outwardly.

The UPD reactor according to the present invention has the advantages of drastically improving evenness in the activated layer of catalysts and manufacturing catalyst particles of equal size because the top surface and the entire wall serve as a working electrode thereby drastically increasing the area size of the reactor chamber to control electric potentials. Not only that, it is effective in that it can monitor the amount of reactants in the reactor chamber, the kind of reaction liquids and input voltages in real time so that quality control is possible in the process of manufacturing catalyst particles.

BRIEF DESCRIPTION OF THE DRAWINGS

FIG. 1 shows the configuration of the UPD reactor according to an embodiment of the present invention.

FIG. 2 is a side view of the top surface of the UPD reactor according to an embodiment of the present invention.

FIG. 3 is a sectional view of the top surface of the UPD reactor according to an embodiment of the present invention.

DETAILED DESCRIPTION OF THE PREFERRED EMBODIMENT

The UDP reactor of the present invention is configured to comprise a top surface configured as an electric conductor to serve as a working electrode while being able to move up and down; a wall configured to have the same shape as the top surface to allow the top surface to move up and down inside the reactor and configured to allow the exterior of the top surface to contact the interior of the wall, and configured as an electric conductor to serve as a working electrode; a bottom surface configured to face the top surface and to join the wall; a power supplying part to input voltages into a reference electrode and an electrode; and a solution injecting part.

Additionally, the UDP reactor of the present invention is configured to comprise a displaying part to show the kind of precursors, the amount of precursors, the kind of reaction liquids, temperatures, pressures, voltages and concentration of products and in doing so, it is configured to comprise a sensor to measure temperatures, pressures, voltages and concentration of products, wherein the sensor to measure concentration of products is configured to comprise infrared light sources and a detector to detect the infrared light sources.

The above described UPD reactor can be described as follows.

By reference to FIG. 1, the UDP reactor of the present invention consists of a top surface 10, a wall 20, a bottom surface 30, a reference electrode 201, a counter electrode 202 and a driving shaft 101 to move the top surface, an ultrasonic wave generator 301 and impeller 302 on the bottom surface to mix solutions inside the reactor. The UPD reactor is preferably made of metals which do not interfere with reactions inside the reactor and has the excellent resistance to oxidation, i.e., one or more of titanium, niobium and graphite, and is more preferably made of titanium or niobium.

In the UPD reactor according to the present invention, the top surface 10 is configured to be able to move up and down inside the wall 20 while serving as a working electrode. In doing so, the top surface 10 has the same shape as the wall 20 and the exterior of the top surface 10 is configured to contact the interior of the wall by virtue of the diameter of the interior of the wall 20 being the same as the diameter of the top surface 10. Up and down movements of the top surface 10 are driven by an electronic motor 102 automatically or manually. The means to move the top surface up and down is not specifically limited because it is generally used in the art to which the present invention pertains. When the UPD reaction begins in a reactor chamber, the top surface 10 of the present invention moves downwards from the place where it is before the UPD reaction begins, so that reaction volumes in the reactor chamber can be reduced. In this case, a drastic reduction in the distance between reactants caused by a reduction in reaction volumes results in equal reactions between reactants. In this process, when the top surface 10 moves downwards, for the solution under the top surface 10 to go up through the top surface, a plurality of channels 103 are configured on the top surface 10 as shown in FIGS. 1 and 2. In this case, only solvents shall go up through the top surface 10 while particulate matter existing in the solution shall remain under the top surface 10. To do so, filters 106 are provided in the channels. The filters are made of polymers or metals through which liquid matter can pass because the filters 106 shall allow solvents to pass but not particulate matter. According to the present invention, precious metals such as titanium, niobium, gold, platinum, etc. or matter containing carbon are preferably used in consideration of resistance to corrosion and inactivity. In the configuration of the top surface 10 according to the present invention, the upward movement of the top surface 10 shall be taken into account. In this case, as in the case of the downward movement of the top surface, the solvent over the top surface 10 shall come down through the top surface 10. When the top surface 10 moves down, the channel through which a solvent passes has a filter inside of it to filter out particulate matter. The filter prevents the solvent from passing rapidly. This means another channel 2, 104, separate from the channel through which a solvent passes, is needed when the top surface 10 moves down. Accordingly, as in FIG. 2, the present invention is configured to comprise separate channels 1 and 2 through which the solvent can pass, according to the upward and downward movement of the top surface 10. FIG. 3 shows a sectional view of the upper part of the top surface 10, wherein a moving shaft 101 is connected to the top surface 10, wherein a cover 105 for channel 2 is placed within a certain area around the connected part, as in FIGS. 1 and 2 and wherein the cover covers up channel 2, 104 when it moves down and channel 2 is opened automatically or manually when the cover moves up.

According to the present invention, the wall 20 of the reactor chamber, as in FIG. 1, shall have the same shape as the top surface because the top surface 10 is embraced by the wall and can move up and down inside the wall, and the exterior of the top surface 10 is configured to contact the interior surface of the wall 20.

To perform the UPD reaction according to the present invention, working, reference and counter electrodes are needed. The working electrode as described above is configured on the top surface 10 and wall 20, and the reference and counter electrodes may be separately configured on the top surface, bottom surface, wall, and so on. FIG. 1, according to an embodiment of the present invention, shows the reference 201 and counter 202 electrodes installed on the wall and all told, two or more reference 201 and counter 202 electrodes are installed through the wall 20. The reference 201 and counter 202 electrodes do not protrude from the interior surface of the wall 20, and filters are placed at the end of the reference 201 and counter 202 electrodes contacting solutions inside the wall 20 so that particulate matter is prevented from contacting electrodes and from leaking outwardly. FIG. 1, according to an embodiment of the present invention, shows a plurality of counter electrodes 202 and a reference electrode 201 placed on the wall 20. Also, the wall 20 of the present invention may be configured to comprise infrared light sources (invisible) to measure concentration of products and a detector (invisible) to detect the infrared light sources, in addition to the above described electrodes. When infrared light is emitted on the particulate matter produced according to the present invention, light scattering is brought about by the particulate matter and then the detector detects the scattered light and measure concentration of the particulate matter. Products available in the market can be used as the infrared light detector and as the infrared light sources according to the present invention.

The UPD reactor of the present invention is configured to comprise a bottom surface 30, placed on the opposite side of the top surface 10 and connected with the wall 20. And the bottom surface 30 further comprises diffusing devices such as an impeller 302, ultrasonic waves, and so on. to evenly diffuse solutions inside the reactor chamber. With reference to this, the impeller 302 at the bottom surface 30 is enclosed in the bottom so that it does not protrude from the bottom, and the impeller 302 is connected to a motor enclosed in the bottom surface 30. An ultrasonic wave generator 301, together with the impeller 302 or in place of the impeller 302, may be configured. In this case, the type of the ultrasonic generator 301 is more preferably diffusion convex or diffusion flat than straight concave.

The reactor chamber, according to the present invention, is configured to comprise a power supplying part to input voltages into electrodes and a solution injecting part. The power supplying and solution injecting parts may be placed on one of the top surface 10, wall 20 and bottom surface 30. The power supplying part is more preferably placed on the wall 20 or the bottom surface 30 which are fixed, than the up and down movable top surface 10. The solution injecting part may be provided on the top surface 10 or the wall 20 and preferably, the solution injecting part is placed in the space created between the wall 20 and top surface 10 when the top surface 10 moves up.

The present invention can comprise a displaying part to show the kind of precursors, the amount of precursors, the kind of reaction liquids, temperatures, pressures, voltages and concentration of products, and the display, separate from the up and down movable top surface 20, may be placed on the edge (exterior) of the top surface 10 or on the exterior of the wall 20. The displaying part is preferably a liquid-crystal display. The displaying part is configured to input information such as the kind of precursors, the amount of precursors and the kind of solutions beforehand. To do so, a keypad interlocked with the displaying part may be comprised. Also, a sensor may be provided inside the reactor chamber to measure temperatures, pressures and voltages in addition to the information input beforehand. Widely available devices can be used as a sensor to measure temperatures, pressures and voltages.

PARTS LIST

- 10: Top surface
- 101: Moving shaft
- 102: Electric motor
- 103: Channel 1
- 104: Channel 2
- 105: Cover for channel 1
- 106: Filter
- 20: Wall
- 201: Reference electrode
- 202: Counter electrode
- 203: Power supplying part
- 30: Bottom surface
- 301: Ultrasonic wave generator
- 302: Impeller

The invention claimed is:

1. An underpotential deposition (UPD) reactor comprising:
   a top surface configured as an electric conductor to serve as a working electrode and further configured to be able to move up and down using an electric motor;
   a wall configured to have an interior which is the same shape as an exterior of the top surface and configured to have an interior diameter which is the same as the diameter of the exterior of the top surface to allow the top surface to move up and down within the interior of the wall, and configured as an electric conductor to serve as the working electrode together with the top surface;
   a bottom surface configured to face the top surface and to be connected to the wall; and
   a power supplying part to input voltages into a reference electrode and a counter electrode and a solution injecting part,
   wherein the UPD reactor comprises one or more of titanium, niobium or graphite.

2. The UPD reactor of claim 1, further comprising a sensor to measure temperatures, pressures, voltages and concentration of products.

3. The UPD reactor of claim 2, wherein the sensor to measure concentration of products is configured to comprise infrared light sources and a detector to detect the infrared light sources.

4. The UPD reactor of claim 1, wherein the top surface can move up and down by the electric motor and a driving shaft connected to the electric motor.

5. The UPD reactor of claim 1, wherein the top surface configured to be able to move up and down by a driving shaft that is manually controllable.

6. The UPD reactor of claim 1, wherein the top surface comprises a plurality of channels to allow solutions under the top surface to go up through the top surface, and wherein the channels comprise filters.

7. The UPD reactor of claim 1, wherein the top surface comprises a plurality of channels to allow solutions over the top surface to come down through the top surface.

8. The UPD reactor of claim 1, wherein the wall comprises two or more of the reference and counter electrodes installed through the wall, wherein the reference and counter electrodes do not protrude from the interior surface of the wall and wherein filters are placed at the end of the reference and counter electrodes contacting solutions inside the wall.

9. The UPD reactor of claim 1, wherein the bottom surface is configured to comprise an impeller to mix solutions inside the reactor chamber and a motor to drive the impeller.

10. The UPD reactor of claim 1, wherein the bottom surface is configured to comprise a flat or convex-type ultrasonic generator to mix solutions inside the reactor chamber.

11. The UPD reactor of claim 9, wherein the impeller is configured to be enclosed in the bottom surface not to protrude outwardly.

12. The UPD reactor of claim 10, wherein the ultrasonic generator is configured to be enclosed in the bottom surface not to protrude outwardly.

* * * * *